Oct. 9, 1923.

H. WILMS

NUT CRACKING MACHINE

Filed Oct. 19, 1921

Inventor:
Hermann Wilms
by Cannot Cannot
his Attorneys.

Patented Oct. 9, 1923.

1,470,247

UNITED STATES PATENT OFFICE.

HERMANN WILMS, OF ST. LOUIS, MISSOURI, ASSIGNOR, BY DIRECT AND MESNE ASSIGNMENTS, TO THE WILCO MACHINE COMPANY, OF ST. LOUIS, MISSOURI, A CORPORATION OF MISSOURI.

NUT-CRACKING MACHINE.

Application filed October 19, 1921. Serial No. 508,697.

*To all whom it may concern:*

Be it known that I, HERMANN WILMS, a citizen of the United States, and a resident of the city of St. Louis, and State of Missouri, have invented a new and useful Improvement in Nut-Cracking Machines, of which the following is a specification.

My invention relates to improvements in automatic nut-cracking machines, wherein the nuts are fed between the opposed ends of an axially yieldable anvil-plunger and a reciprocatable hammer-plunger to be cracked therebetween, and has for its principal object to provide means for automatically locking the anvil-plunger against movement at a predetermined point of the working stroke of the hammer-plunger, whereby said hammer-plunger is adapted to travel a fixed distance at all times irrespective of the position of the anvil plunger or the length of the engaged nut. Another object is to provide an adjustment for the lock actuating means, whereby the length of the cracking movement of the anvil-plunger can be adjusted. Another object is an improved feeding means. Another object is to carry the nuts into an open space before cracking, whereby the nuts are free from restraint during such cracking operation. Another object to is to provide a slip-drive connection between the machine and its driving mechanism, whereby the machine is adapted to automatically discontinue its operation in the event that the nut engaging plungers engage an unyielding substance. Another object is to prevent the nuts from being removed two at a time from the charging hopper. The invention consists principally in the means for accomplishing the above mentioned objects; and it also consists in the combinations and arrangements of parts hereinafter described and claimed.

In the accompanying drawings, which form part of this specification, and wherein like symbols refer to like parts wherever they occur, Fig. 1 is a vertical longitudinal section through a nut-cracking machine embodying my invention, the section being taken along the axes of the nut engaging plungers;

Fig. 5 is a fragmentary detail section on the line 5—5 in Fig. 3.

Figure 1:
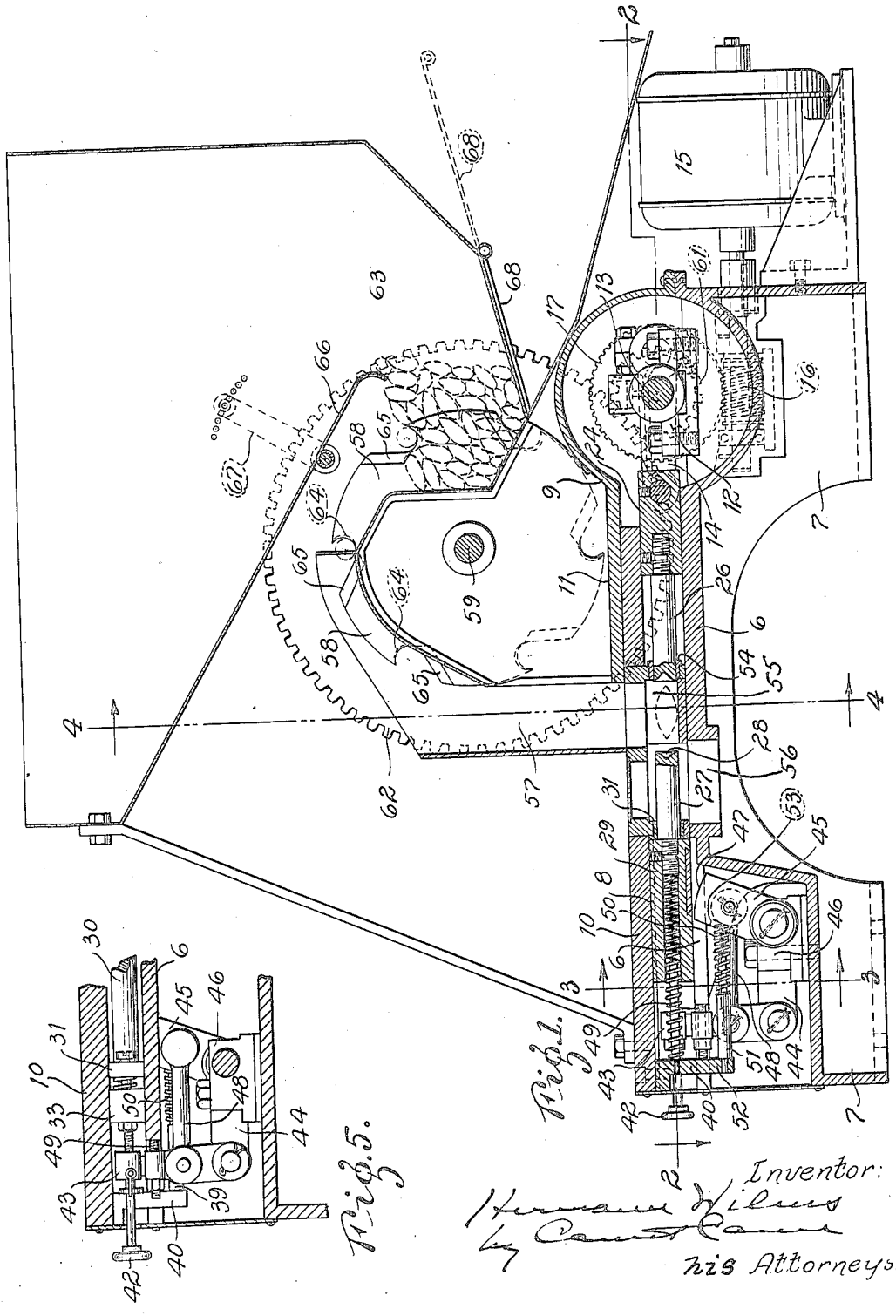
Figure 2:
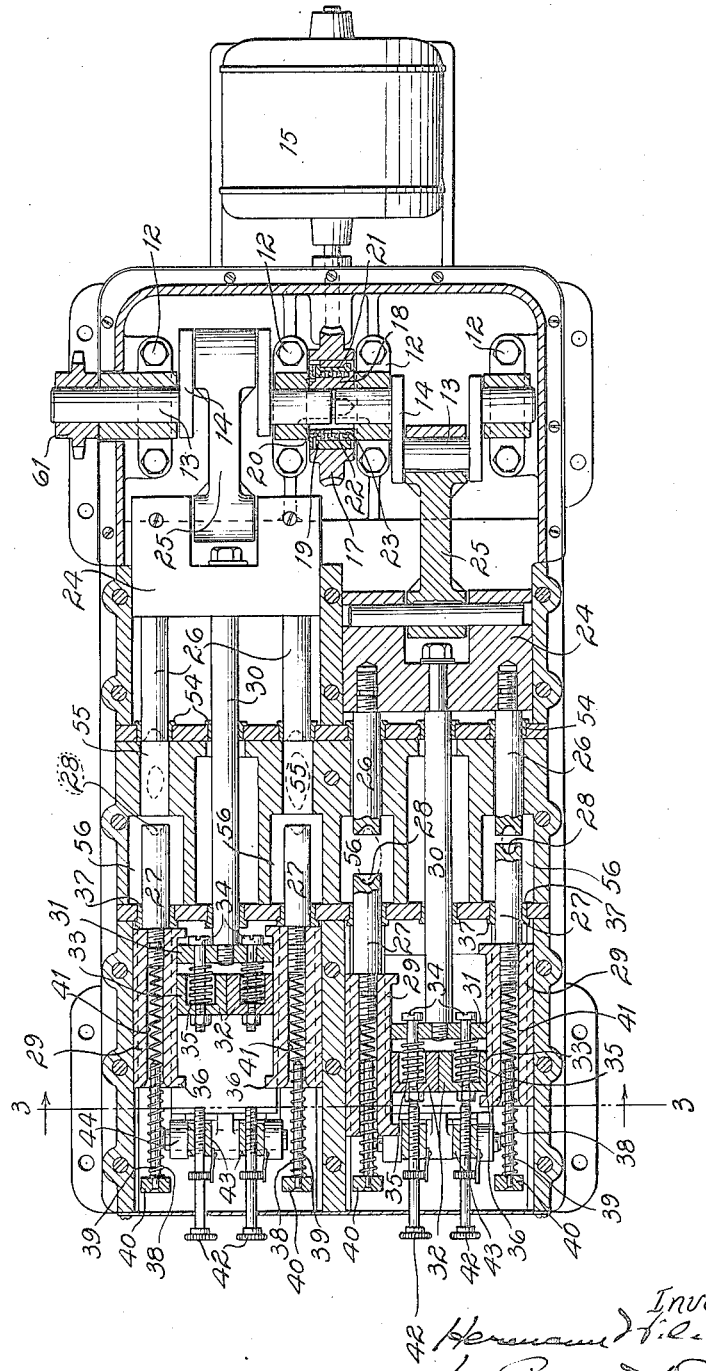
Fig. 2 is a horizontal section thereof on the line 2—2 in Fig. 1.
Figure 3:
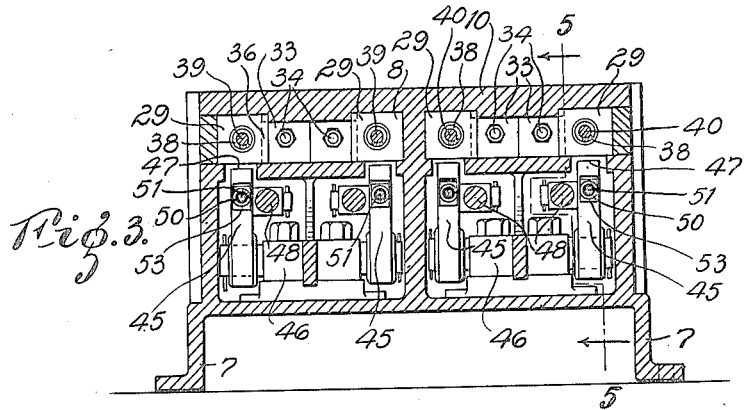
Fig. 3 is a vertical cross-section on the line 3—3 in Fig. 1.
Figure 4:
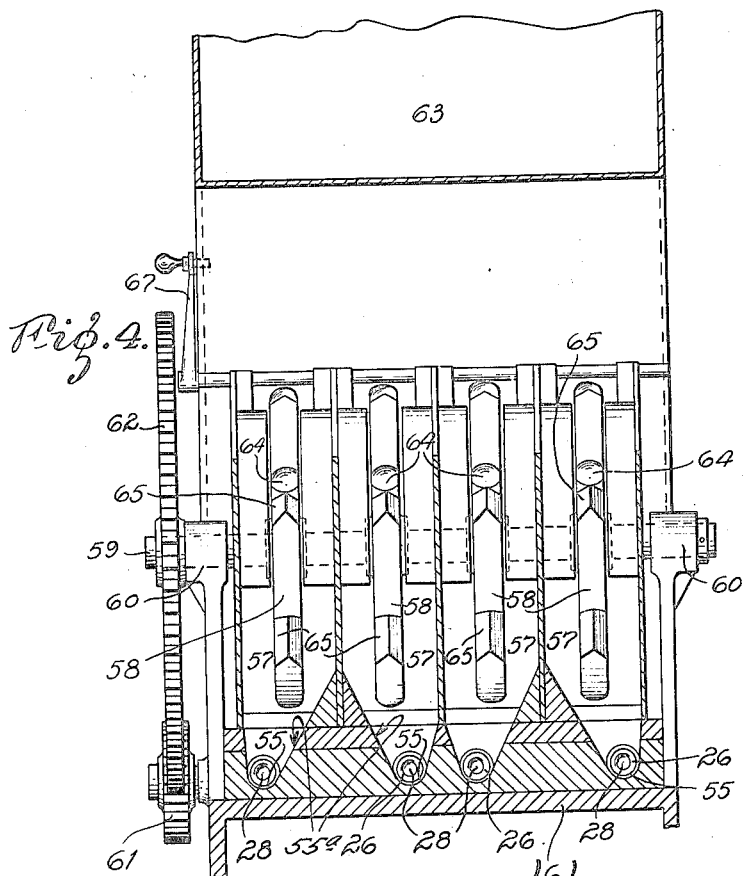
Fig. 4 is a vertical cross-section through the nut receiving pockets on the line 4—4 in Fig. 1.

The nut-cracking machine shown in the accompanying drawings comprises a table 6 having legs 7 and depressed housing portions 8 and 9 formed in its opposite ends, the housing 8 being covered by a flat cover-plate 10, and the housing 9 being closed by the upwardly enlarged portion of a cover-plate 11.

Journaled in bearings 12 in the rear housing of the table 6 is a two-part crank-shaft 13, each part being provided with a double-crank 14. The crank-shaft is driven by means of an electric motor 15 having a worm 16, which meshes with a worm gear ring 17 that surrounds the opposing ends of the two sections of said crank-shaft. The worm gear ring has a bushing 18 keyed therein which is provided at one end with an inwardly projecting flange 19, whose outer surface has a series of pointed clutch teeth formed thereon. These teeth mesh with similar teeth formed on the inner surface of the outwardly projecting end flange 20 of a collar 21, which surrounds the opposing ends of the crank-shaft sections and is keyed thereto. The teeth of the worm gear bushing 18 and the crank-shaft collar 21 are normally held in mesh by means of a helical spring 22, which bears at one end against the flange 19 of said bushing and at its opposite end against an annular shoulder 23 formed on said collar. By this arrangement, strain on the worm gear, in excess of the power of the spring 22 to hold the teeth of the bushing and collar in mesh, causes said teeth to be forced out of mesh, thus automatically disconnecting said worm gear from the crank-shaft.

Slide-blocks 24 are mounted in horizontal slide-ways formed in the upper surface of the table 6 and are connected to the doublecranks 14 of the crank-shaft 13 by means of connecting rods or links 25, whereby the circular motion of said cranks imparts a reciprocating motion to said slide-blocks. Each of the slide-blocks 24 carries a pair of spaced hammer-plungers 26, which project forwardly from the front faces thereof. Each pair of hammer-plungers 26 is adapted to cooperate with a pair of anvil-plungers 27 disposed in axial alinement therewith to crack a nut therebetween. The opposing ends of the hammer-plungers and the anvil-plungers are provided with conical depressions or recesses 28 adapted to fit the ends of the nuts. Each pair of anvil plungers is carried by slide-blocks 29, which are mounted in horizontal slide-ways formed by the upper surface of the table 6 and the cover-plate 10 therefor.

Projecting forwardly from the front face of each hammer-plunger block 24, midway between the hammer-plungers 26 and in horizontal alinement therewith, is a plunger rod 30. These rods are disposed parallel with the hammer-plungers and have one end fixedly secured to the hammer-plunger blocks 24. The plunger rods 30 extend between the anvil-plungers 27 and their supporting blocks 29 and are provided at their ends with cross-plates 31. These plates extend on opposite sides of the plunger rods 30 and are adapted to cooperate with lugs 32, which project from the opposing surfaces of each pair of anvil-plunger blocks 29 at the plunger ends thereof. The cross-plate of each plunger-rod 30 is provided with a pair of independently yieldable heads 33, which are arranged side by side on opposite sides of said rod between the opposing faces of each anvil-plunger block 29 of a pair. The yieldable heads 33 are provided with stems 34, which pass through holes formed in the cross-plates 31 on opposite sides of the plunger rods 30 therefor. The heads 33 are hollowed out to accommodate helical springs 35, which are sleeved on the stem portions 34 thereof. These springs bear at their opposite ends against the heads 33 and said cross-plates 31, thereby normally holding said heads away from said cross-plates. Each plunger-head 33 is adapted to cooperate with a lug 36 on the anvil-plunger block located adjacent thereto. These lugs project from the opposing surfaces of each pair of anvil-plunger blocks at the ends opposite from the plungers ends thereof.

The anvil-plunger blocks 29 are normally held in their projected positions, with the plunger ends thereof abutting against guide bushings 37 for the anvil-plungers, by means of springs 38. These springs are located in the housing 8 of the table 6 and are supported at one end on pins 39 that project horizontally from the depending flanges of brackets 40, whose horizontal flanges are preferably secured to the cover-plate 10 of said table. The opposite ends of the springs 38 are supported in horizontal bores 41 in the anvil-plunger blocks 29, said bores being disposed in axial alinement with the pins 39, whereby said bores are adapted to receive said pins during the rearward movement of said blocks.

The stems 34 of the heads 33 of the plunger-rods 30 extend beyond said heads and are adapted to cooperate with knurled-handled adjusting screws 42. These screws are threaded through the upper ends of upright lever arms 43, which are pivotally supported at their lower ends in brackets 44 bolted to the bottom of the housing 8. Lock-arms 45 have their lower ends pivotally supported in the brackets 46 and are provided at their upper ends with curved cam surfaces 47 adapted to engage the under surfaces of the anvil-plunger blocks 29. The lever arms 43 are connected at their middle portions to the lock arms 45 by means of links 48. Adjustable stops, in the form of studs 49 are threaded through the lever arms 43, between the links 48 and the studs 49, and abut against the rear end of the table 6, which supports the anvil plunger blocks 29 and the cross-plates 31 and yieldable heads of the plunger rods 30. Helical springs 50 are provided for normally holding the cam surfaces 47 of the lock-arms 45 away from the under surfaces of the anvil-plunger blocks 29 and for holding the adjustable stops 49 on the lever arms 43 against the end of the table 6. These springs are supported on horizontal pins 51 which project forwardly from angle brackets 52 and bear at one end against shouldered portions of said pins and at the opposite end against the bottoms of square recesses 53 formed in the adjacent rear faces of the lock-arms 45. By this arrangement the normal clearance between the cam surfaces of the lock-arms and the undersurfaces of the anvil-plunger blocks may be regulated by manipulating the adjustable stop-screws 49.

The forward ends of the hammer-plungers are slidably supported in guide bushings 54, and in their forward movement travel across the bottoms of nut receiving pockets 55, which open into enlarged cracking and discharging spaces or openings 56 that extend through the bottom of the table. The sides of the nut receiving pockets 55 are beveled, as at 55ª and their bottoms are of slightly greater width and length than the width and length of the largest nut; and the delivery openings 56, by reason of the cracking action occurring therewithin, are made of a width sufficient to permit free expansion of the fractured nuts.

The nut receiving pockets 55 communicate with the lower ends of a series of vertical passageways 57. Feed-wheels 58 are disposed within said passageways with their downwardly moving sides flush with the nut receiving pockets 55 at the bottom thereof. The feed-wheel for each passageway is fixed to a single horizontal shaft 59, which extends through the walls of said passageways and is journaled at its opposite ends in the bearings 60 that project upwardly from the table.

The feed-wheel shaft 59 is driven from the crank-shaft 13 by means of a pinion 61, which is fixed to said crank-shaft and meshes with a gear 62 fixed to said feed-wheel shaft.

The upwardly moving rear sides of the feed-wheels travel through a series of spaced vertical slots formed in the inclined lower portion of a nut receptacle or hopper 63. The peripheral surface of the feed-wheels are provided with a series of radially spaced V-shaped notches, one of each notches being concave, as at 64, which concavities are disposed lowermost on the upwardly moving side of the wheel, and the opposite side being beveled, as at 65, from its middle towards each side of the wheel and disposed substantially upright on said side of said wheel. The nut hopper is provided with a hinged gate 66 for controlling the level of the nuts therein; and an operating handle 67 is provided for swinging said gate. The hopper is also provided with a slide bottom 68, whereby dirt or other foreign material may be removed.

The operation of the machine is as follows: The concave portions 64 of the feed-wheels travel through the pile of loose nuts on the upwardly moving side of said wheels and function as seats or cups which lift the nuts out of the hopper, the beveled portions 65 of said notches serving as a means for preventing the nuts from being lifted out of the hopper two at a time. The nuts are then carried rearwardly in the pockets of the rotatable feed-wheels and, by reason of the inverted portions assumed by the notches on the downwardly moving sides of said wheels, are discharged therefrom into the vertical passageways 57 and drop into the nut receiving pockets 55 at the bottom thereof. The nuts in falling through the vertical passageways strike the inclined walls 55ª of the pockets 55, and are thus delivered into the bottoms of said pockets with their pointed ends facing the opposing ends of the nut engaging plungers 26 and 27. In the event of the deposit of a nut in a pocket while a hammer-plunger is moving therethrough the nut will rest upon said plunger until the same is withdrawn, whereupon the nut will fall to the bottom of said pocket in position to be engaged by the forward end of said plunger.

The hammer-plungers, at the beginning of their forward movement through the pockets 55, engage the nuts therein and cause their pointed ends to seat in the conical depressions 28 in the forward ends of said plungers. The nuts are then forced along the pockets until their forward ends seat in the depressions 28 formed in the ends of the anvil-plungers, whereupon the continued forward movement of said plungers forces the nuts out of the pockets 55 into the enlarged discharge openings 56. This movement also forces the anvil-plungers and their supporting blocks 29 backwards against the pressure of the springs 38. During this forward movement of the hammer-plungers, the plunger-rods 30 also move forward until the stems 34 of the yieldable heads 33 abut against the adjusting screws 42 on the lever arms 43, thus causing said levers to swing rearwardly. This swinging movement of the lever arms 43, by reason of their link connections 48 with the lock-arms 45, causes said lock-arms to swing upwardly until their cam surfaces bind against the under sides of the anvil-plunger slide-blocks and thus lock the anvil-plungers against further movement. The shells of the nuts are then cracked between the opposing ends of the hammer-plungers and anvil-plungers by a continued movement of the hammer-plungers to the end of their forward strokes.

After nuts have been cracked between the cooperating ends of the nut engaging plungers, the hammer-plungers are retracted while the anvil-plungers remain locked, thus permitting the cracked nuts to fall through the delivery openings 56. It is noted that the carrying of the nuts from the narrow pockets 55 into the larger discharge openings 56 permits free expansion of the shells freely during the cracking operation. During the return movement of the hammer-plungers, the cross-plates 31 of the plunger-rods 30, engage the lugs 32 at the plunger ends of the anvil-plunger blocks 29 and force said blocks to move with said cross-plates, thus causing the curved upper ends 47 of the lock-arms 45 to release their grip on the under sides of said blocks. The anvil-plunger blocks are then forced forward into the normal positions by the springs 38, during which time the hammer-plungers complete their return strokes and are again in position to travel forward and engage the nuts in the pockets.

In the event that the hammer-plungers move forward without engaging a nut, the heads 33 will engage the lugs 36 at the rear ends of the anvil-plunger blocks and carry said blocks to their locking positions in advance of said anvil-plungers, after which the heads 33 and stems 34 yield with respect to the immovable lever arm screws 42 and slide-block lugs 36 and permit the plunger-rods 30 to complete their forward movement.

The point of locking the anvil-plungers may be varied to lengthen or shorten the crushing movement of the hammer-plungers for nuts of different lengths by adjusting the lever-arm screws 42 towards and away from the lever actuating stems 34.

The length of travel of the hammer-plungers and the plunger-rods 30 is the same at all times, but the distance which the anvil-plungers are retracted depends on the length of the engaged nuts. Thus, the point of locking of the retracted anvil-plungers is controlled by the length of the engaged nuts, while the length of the cracking stroke of the hammer-plungers remains the same, regardless of the positions in which the anvil-plungers are locked.

Obviously, the hereinbefore described construction admits of considerable variation without departing from the invention.

What I claim is:—

1. In a nut-cracking machine, an axially yieldable anvil-plunger, a reciprocatory hammer-plunger disposed in axial alinement with said anvil-plunger, means for locking said anvil plunger, a plunger rod carried by said hammer-plunger for actuating said locking means to lock said anvil-plunger at a predetermined point of the forward movement of said hammer-plunger, and yieldable means on the lock engaging end of said lock actuating plunger, whereby the hammer-plunger is permitted to complete its forward stroke.

2. In a nut-cracking machine, a supporting frame, an anvil-plunger mounted for yielding movement in said frame, a block slidably mounted in said frame for reciprocatory movement, said block having a hammer-plunger projecting therefrom in axial alinement with said anvil-plunger, locking means for said anvil-plunger, and means carried by said block for actuating said locking means by direct engagement therewith to lock said anvil-plunger at a predetermined point of the forward movement of said hammer-plunger.

3. In a nut-cracking machine, a supporting frame, a pair of independently yieldable anvil-plungers mounted in said frame, a block slidably supported in said frame for reciprocatory movement towards and away from said anvil-plungers and having a pair of hammer-plungers projecting towards said anvil-plungers in axial alinment therewith, separate locking means for each of said anvil-plungers, means carried by said block for simultaneously actuating the locking means for each of said anvil-plungers to lock said pair of anvil-plungers at a predetermined point of the forward movement of said hammer-plunger block irrespective of the position of one anvil-plunger with relation to the other, and means carried by said block for unlocking said anvil-plungers by direct engagement therewith during the return stroke of said pair of hammer-plungers.

4. In a nut-cracking machine, a supporting frame, a pair of independently yieldable anvil-plungers mounted in said frame, a block slidably supported in said frame for reciprocatory movement towards and away from said anvil-plungers and having a pair of hammer-plungers projecting towards said anvil-plungers in axial alinement therewith, separate locking means for each of said anvil-plungers, means carried by said block for simultaneously actuating the locking means for each of said anvil-plungers to lock said pair of anvil-plungers at a predetermined point of the forward movement of said hammer-plungers irrespective of the position of one anvil-plunger with relation to the other, and means carried by said block for unlocking said anvil-plungers by direct engagement therewith during the return movement of said pair of hammer-plungers, said locking actuating means being adapted to yield after engagement with said locking means a distance sufficient to permit said hammer-plungers to move to the end of their forward strokes.

5. In a nut-cracking machine, a supporting frame, a pair of independently yieldable anvil-plungers mounted in said frame, a block slidably supported in said frame for reciprocatory movement towards and away from said anvil-plungers and having a pair of hammer-plungers projecting towards said anvil-plungers in axial alinement therewith, means for feeding nuts between the opposed ends of said plungers, separate locking means for each of said anvil-plungers, and plunger carried by said block for simultaneously actuating the locking means for each of said anvil-plungers to lock said pair of anvil-plungers at a predetermined point of the forward movement of said hammer-plungers irrespective of the position of one anvil-plunger with relation to the other, and yieldable means on the lock engaging end of said lock actuating plunger and adapted to permit said hammer-plungers to move to the end of their forward strokes after the engagement of said locking devices by said lock actuating means.

6. In a nut-cracking machine, a supporting frame, a yieldable block slidably supported on said frame and having an anvil-plunger projecting therefrom, a block slidably supported on said frame and having a hammer-plunger projecting towards said anvil-plunger and in axial alinement therewith, means for reciprocating said hammer-plunger block towards and away from said anvil-plunger, means for feeding nuts between the opposed ends of said plungers, locking means for said anvil-plunger, a plunger-rod projecting from said hammer-plunger block in parallel alinement with the hammer-plunger thereof, a cross-plate fixed to said plunger-rod and adapted in the return movement of said hammer-plunger block to cooperate with a lateral lug adjacent to the plunger-end of said anvil-plunger block, and an axially yieldably head slidably supported by said cross-plate, said head being adapted in the forward movement of said hammer-plunger block to engage said locking means to actuate the same, said cross-plate being adapted in the return movement of said hammer-plunger block to engage the lateral lug on said anvil-plunger block to unlock the same.

7. In a nut-cracking machine, a supporting frame, a yieldable block slidably supported on said frame and having an anvil-plunger projecting therefrom, a block slidably supported on said frame and having a hammer-plunger projecting towards said anvil-plunger and in axial alinement therewith, means for reciprocating said hammer-plunger block towards and away from said anvil-plunger, means for feeding nuts between the opposed ends of said plungers, locking means for said anvil-plunger, a plunger-rod projecting from said hammer-plunger block in parallel alinement with the hammer-plunger thereof, a cross-plate fixed to said plunger rod and adapted in the return movement of said hammer-plunger block to cooperate with a lateral lug adjacent to the plunger ends of said anvil-plunger block, an axially yieldable head slidably supported by said cross-plate, said head being adapted in the forward movement of said hammer-plunger block to engage said locking means to actuate the same, said cross-plate being adapted in the return movement of said hammer-plunger block to engage the lateral lug on said anvil-plunger block to unlock the same, and adjustable means associated with said locking means whereby the point of locking of said anvil-plunger block can be adjusted to occur at a predetermined point of the forward stroke of said hammer-plunger.

8. In a nut-cracking machine, a supporting frame, a pair of independently yieldable slide-blocks slidably supported on said frame, each of said slide-blocks having an anvil-plunger projecting therefrom, a block slidably supported on said frame and having a pair of hammer-plungers projecting therefrom towards said anvil-plunger and in axial alinement therewith, means for reciprocating said hammer-plunger block towards and away from said pair of yieldable anvil-plungers, means for feeding nuts between the opposed ends of said opposed pairs of plungers, separate locking means for said anvil-plunger blocks, a plunger-rod projecting from said hammer-plunger block between the pair of hammer-plungers thereof and said anvil-plungers and their supporting block, a cross-plate fixed to said plunger-rod and adapted to cooperate with a lateral lug adjacent to the plunger end of each of said anvil-plunger blocks, and a pair of independently axially yieldable heads mounted on said cross-plate and adapted in the forward movement of said hammer-plunger block to engage said locking means to actuate the same, said cross-plate being adapted in the return movement of said hammer-plunger block to engage the lateral lugs on said anvil-plunger blocks to unlock the same.

9. In a nut-cracking machine, a yieldable anvil-plunger, a reciprocatory hammer-plunger disposed in axial alinement with said anvil-plunger, a pivotally supported lock-arm adapted to engage said anvil-plunger, a pivotally supported actuating lever having a link connection with said lock-lever, and means carried by said hammer-plunger for actuating said lever, thereby forcing said lock-lever into engagement with said anvil-plunger to lock the same at a predetermined point of the forward movement of said hammer-plunger.

10. In a nut-cracking machine, a yieldable anvil-plunger, a reciprocatory hammer-plunger disposed in axial alinement with said anvil-plunger, means for feeding a nut between the opposed ends of said plungers, a pivotally supported lock-arm adapted to engage said anvil-plunger, a pivotally supported actuating lever having a link connection with said lock-lever, means carried by said hammer-plunger for forcing said lock-lever into engagement with said anvil-plunger to lock the same at a predetermined point of the forward movement of said hammer-plunger, and adjustable means on said actuating lever for regulating the normal clearance between said lock-arm and said anvil-plunger.

11. In a nut-cracking machine, a yieldable anvil-plunger, a reciprocatory hammer-plunger disposed in axial alinement with said anvil-plunger, a pivotally supported lock-lever adapted to engage said anvil-plunger, a lever-arm having a link connection with said lock-lever, and a plunger-rod carried by said hammer-plunger and adapted to engage the free end of said lever-arm to force said lock-arm into engagement with said anvil-plunger at a predetermined point of the forward movement of said hammer-plunger.

12. In a nut-cracking machine, a yieldable anvil-plunger, a reciprocatory hammer-plunger disposed in axial alinement with said anvil-plunger, a pivotally supported lock-lever adapted to engage said anvil-plunger, a lever-arm having a link connection with said lock-lever, a plunger rod carried by said hammer-plunger and adapted to engage the free end of said lever-arm to force said lock-arm into engagement with said anvil-plunger at a predetermined point of the forward movement of said hammer-plunger, and yieldable means on the free end of said plunger-rod whereby the latter is adapted to complete its forward stroke regardless of the point of locking of said anvil-plunger.

13. In a nut-cracking machine, a yieldable anvil-plunger, a reciprocatory hammer-plunger disposed in axial alinement with said anvil-plunger, a pivotally supported lock-lever adapted to engage said anvil-plunger, a lever-arm having a link connection with said lock-lever, an adjusting screw mounted on the free end of said lever-arm, a plunger-rod carried by said hammer-plunger and adapted to abut against the free end of said adjusting screw to force said lock-arm into engagement with said anvil-plunger at a predetermined point of the forward movement of said hammer-plunger, and an adjustable stop on said lever-arm for regulating the normal clearance between said lock-lever and said anvil-plunger.

14. In a nut-cracking machine, a plurality of independently axially yieldable anvil-plungers, a plurality of cooperating hammer-plungers disposed in axial alinement with said anvil-plungers and adapted for joint axial movement towards and away from the same, separate locking means for each of said anvil-plungers, and a single means carried by said hammer-plungers and adapted to directly engage the locking means for all of said anvil-plungers to simultaneously lock the same at a predetermined point of the forward movement of said hammer-plungers.

Signed at St. Louis, Missouri, this 15th day of October, 1921.

HERMANN WILMS.